US012748250B2

(12) United States Patent
Watson et al.

(10) Patent No.: US 12,748,250 B2
(45) Date of Patent: Sep. 29, 2026

(54) ULTRA-THIN FRONTLIGHT HAVING AN OPTICAL COUPLING ELEMENT

(71) Applicant: reMarkable AS, Oslo (NO)

(72) Inventors: Thomas James Watson, Cambridge (GB); Emma Rachel Lewis, Cambridge (GB); Isobel Jane Ashbey, Cambridge (GB); Hessel Vink, Oslo (NO)

(73) Assignee: reMarkable AS, Oslo (NO)

( * ) Notice: Subject to any disclaimer, the term of this patent is extended or adjusted under 35 U.S.C. 154(b) by 337 days.

(21) Appl. No.: 18/536,359

(22) Filed: Dec. 12, 2023

(65) Prior Publication Data

US 2025/0189714 A1 Jun. 12, 2025

(51) Int. Cl.
*F21V 8/00* (2006.01)

(52) U.S. Cl.
CPC ......... *G02B 6/0031* (2013.01); *G02B 6/0065* (2013.01); *G02B 6/0073* (2013.01)

(58) Field of Classification Search
CPC .......................................... G02B 6/0011–0031
See application file for complete search history.

(56) References Cited

U.S. PATENT DOCUMENTS 9,466,246 B1 10/2016 Jalava
9,622,326 B1 4/2017 Devyver
9,961,744 B1 5/2018 Doar
11,208,346 B2 12/2021 Hall et al.
2002/0172039 A1* 11/2002 Inditsky ............... G02B 6/0043 362/231
2005/0129357 A1* 6/2005 Yang .................... G02B 6/0038 385/901
2006/0062016 A1 3/2006 Dejima
2008/0260329 A1* 10/2008 Epstein ................ G02B 6/0028 385/32
2008/0266863 A1 10/2008 Rinko
2010/0048085 A1 2/2010 Kayanuma
2015/0049505 A1 2/2015 Wang
2015/0175478 A1 6/2015 Ravichandran et al.
(Continued)

FOREIGN PATENT DOCUMENTS

FR 2907195 A1 * 4/2008 ........... G02B 6/0016
JP 5874803 B1 3/2016
KR 100628264 B1 * 9/2006 ........... G02B 6/0068

OTHER PUBLICATIONS

English translation of KR 100628264 B1 (Year: 2006).*
(Continued)

*Primary Examiner* — Charlie Y Peng
(74) *Attorney, Agent, or Firm* — AWA Sweden AB; Thomas L. Ewing

(57) ABSTRACT

Embodiments of the invention provide an ultra-thin front-light comprising an optical coupling element that receives light from a light source and directs the received light into a lightguide which is thinner than the height of the light source. The height of the optical coupling element is approximately the same or greater than that of the light source and the optical coupling element is refractively index matched to the lightguide. The optical coupling element may be composed of the same material as the lightguide. The optical coupling element has several reflecting surfaces, which may be polished, metallized, or have dielectric mirror coatings.

20 Claims, 7 Drawing Sheets

(56) References Cited

U.S. PATENT DOCUMENTS

2015/0219834 A1 8/2015 Nichol

OTHER PUBLICATIONS

Extended European search report for application 24218794.6-1001, issued Apr. 9, 2025.
PCT International Search Report and Written Opinion, PCT Application No. PCT/182023/000121, Sep. 20, 2023, 10 pages.
PCT Search Report for Application PCT/EP2024/062475 filed by reMarkable AS as a counterpart of the instant application.

* cited by examiner

ULTRA-THIN FRONTLIGHT HAVING AN OPTICAL COUPLING ELEMENT

TECHNICAL FIELD

The disclosure relates generally to a frontlight, adapted for various display devices such as a digitizer or a tablet. In particular, embodiments of the present invention relate to an ultra-thin frontlight in which the light source is separated from the lightguide by an optical coupling element.

BACKGROUND

Mobile telephones, tablet computers, PCs, car entertainment systems, white goods and many other devices are commonly equipped with interactive displays. These interactive displays combine a display screen, such as an LCD, oLED, plasma or electrophoretic display (EPD), with an input system, such as a touch- or pen-stylus-input system. The input system recognizes the presence of an input object such as a pen-stylus touching or in close proximity to the display screen.

The displays screens, such as EPDs, included in these devices are typically passive in that they modulate light but do not produce light in the manner of other types of displays like conventional cathode ray tube displays. As a consequence, when passive displays like EPD displays are placed in darkened environments, users may have difficulty seeing the display. In a completely darkened room, the user might not be able to see the display at all.

As a consequence, passive display devices may be equipped with various lighting means, such as a frontlight that adds light to the display enabling users to see the display in low ambient light conditions. FIG. 1 illustrates a prior art frontlight having a lightguide 103, a thin filament of a transparent material, such as glass or plastic, which is capable of transmitting light signals through successive internal reflections. The lightguide 103 receives its light from a plurality of light sources (e.g., LEDs 105*a*-105*h*) mounted on an LED circuit board 109 and then adds light to the image emitted by the underlying display (e.g., EPD) not shown in FIG. 1 but located beneath the lightguide 103. The light sources 105*a*-105*h* are located at various positions along the edge of the lightguide 103.

In conventional designs, the light sources 105*a*-105*h* are directly coupled to the lightguide 103. The light sources 105*a*-105*h* tend to be substantially thicker than the lightguide 103. As demands grow to make devices (e.g., tablets) thinner, designers have implemented smaller light sources and thinner lightguides. Using conventional equipment, designers may find it somewhat simpler to locate substantially thinner lightguides (e.g., 50 um) than substantially thinner light sources (e.g., LEDs with 300 um emitter height). The height disparity between the lightguide 103 and the light sources 105*a*-105*h* causes a substantial leakage of light from the light sources 105*a*-105*h* that does not reach the lightguide 103, impairing the overall functional utility of the frontlight. Thus, a conventional solution to the reduced screen brightness calls for an increase in the number of LEDs employed in the frontlight, which itself leads to increased cost, power consumption, and other difficulties.

While great strides have been made in recent years in improving frontlights on passive display devices, further improvements are still warranted. Moreover, specific use cases for passive display devices may compel levels of precision and additional functionality not available in conventional devices.

SUMMARY OF THE INVENTION

Embodiments of the invention provide a frontlight in a tablet computing device. The frontlight includes a light source, an optical coupling element that receives light from the light source, and a lightguide that receives light from the light source through the optical coupling element, the light source having an emitter height greater than a thickness of the lightguide.

In at least one embodiment of the invention, light originating from the light source that initially misses the lightguide while traversing the optical coupling element is reflected at surfaces on the optical coupling element and enters the lightguide after undergoing additional reflections within the optical coupling element.

In at least one embodiment of the invention, the optical coupling element has a front surface adjacent to the lightguide that has been mirror coated, wherein light incident on the front surface from within the optical coupling element is reflected back into the optical coupling element, and a rear surface adjoining the light source that has been mirror coated, wherein light incident on the rear surface from within the optical coupling element is reflected back into the optical coupling element.

In at least one embodiment of the invention, the optical coupling element has a top surface and a bottom surface, wherein both the top surface and the bottom surface are optically polished, wherein light having an incident angle below a critical angle for total internal reflection that is incident on at least one of the top surface and the bottom surface is reflected into the body of the optical coupling element.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The FIGURES (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Disclosed is an ultra-thin frontlight that attempts to improve the efficiency in the transfer of light from a light source into a lightguide. As discussed below, the ultra-thin frontlight includes an optical coupling element that aids in the transition of light from a significantly thicker light source into a substantially thinner lightguide. This ultra-thin frontlight is suitable for application with a variety of display devices but is initially intended for application to a tablet device having a passive display.

To provide a context for the implementation of an ultra-thin frontlight into devices of various types, the initial portion of the following disclosure describes a tablet device into which the ultra-thin frontlight could be applied. An ordinary artisan will recognize and appreciate that the ultra-thin frontlight disclosed is amenable to incorporation in a number of different devices and not just the tablet computing device described.

Example System and Device Configuration

Figure 2:
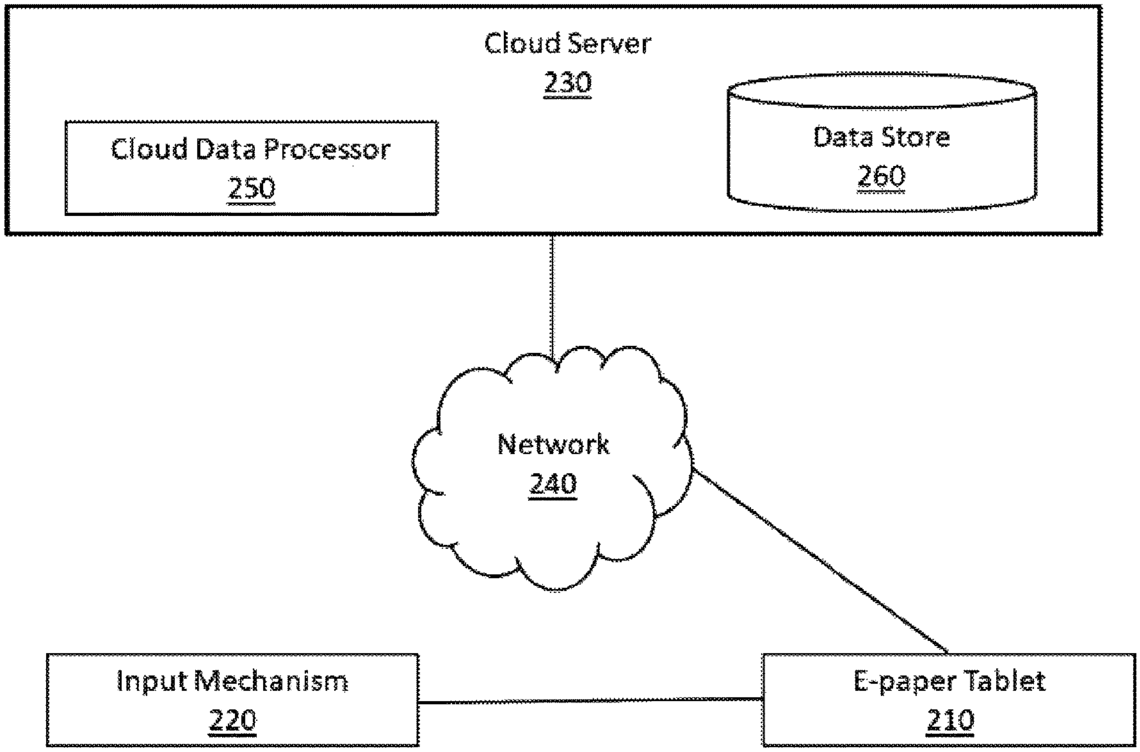
FIG. 2 illustrates a system architecture for an e-paper tablet device that receives inputs from the input mechanism such as a pen-stylus, according to one example embodiment.

As shown in FIG. 2, the e-paper tablet device 210 receives inputs from an input mechanism 220, for example, when the input mechanism 220 makes physical contact with a contact-sensitive surface (e.g., the touch-sensitive screen) on the e-paper tablet device 210 as the user makes a gesture of some sort with the input mechanism 220. The input mechanism 220 may be a pen-stylus or other devices including the user's finger. The e-paper tablet device 210 here is referred to as an "e-paper tablet," a device that mimics the appearance of ordinary ink on paper. Such devices are also known as "electronic paper" and "electronic ink". While embodiments of the invention have been designed for e-paper systems, embodiments of the invention may also be suitable for other forms of computing devices. Based on the nature of the contact, the e-paper tablet device 210 generates and executes instructions for updating content displayed on the contact-sensitive screen to reflect the gesture inputs. For example, in response to a gesture transcribing a verbal message (e.g., a written text or a drawing), the e-paper tablet device 210 updates the contact-sensitive screen to display the transcribed message. As another example, in response to a gesture selecting a navigation option, the e-paper tablet device 210 updates the screen to display a new page associated with the navigation option.

The input mechanism 220 may refer to any device or object that is compatible with the contact-sensitive screen of the e-paper tablet device 210. In one embodiment, the input mechanism 220 may work with an electronic ink (e.g., E-ink) contact-sensitive screen. For example, the input mechanism 220 may refer to any device or object that can interface with a screen and, from which, the screen can detect a touch or contact of said input mechanism 220. Once the touch or contact is detected, electronics associated with the screen generate a signal which the e-paper tablet device 210 can process as a gesture that may be provided for display on the screen. Upon detecting a gesture by the input mechanism 220, electronics within the contact-sensitive screen generate a signal that encodes instructions for displaying content or updating content previously displayed on the screen of the e-paper tablet device 210 based on the movement of the detected gesture across the screen. For example, when processed by the e-paper tablet device 210, the encoded signal may cause a representation of the detected gesture to be displayed on the screen of the e-paper tablet device 210, for example a scribble. As mentioned, the input mechanism 220 may a pen-stylus or another type of pointing device, including a part of a user's body, such as a finger.

In one embodiment, the input mechanism 220 is an encased magnetic coil. When in proximity to the screen of the e-paper tablet device 210, the magnetic coil helps generate a magnetic field that encodes a signal that communicates instructions, which are processed by the e-paper tablet device 210 to provide a representation of the gesture for display on the screen, e.g., as a marking. The input mechanism 220 may be pressure-sensitive such that contact with the contact-sensitive display causes the magnetic coil to compress. In turn, the interaction between the compressed coil and the contact-sensitive screen of the e-paper tablet device 210, may generate a different encoded signal for processing, for example, to provide for display a representation of the gesture on the screen that has different characteristics, e.g., thicker line marking. In alternate embodiments, the input mechanism 220 includes a power source, e.g., a battery, that can generate an electric field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass material coated with a conductive material. Electrodes, or an alternate current carrying electric component, are arranged vertically along the glass coating of the screen to maintain a constant level of current running throughout the screen. A second set of electrodes are arranged horizontally. The matrix of vertical active electrodes and horizontal inactive electrodes generates an electrostatic field at each point on the screen. When an input mechanism 220 with conductive properties, for example the encased magnetic coil or a human finger, is brought into contact with an area of the screen of the e-paper tablet device 210, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, for example a glass or plastic and a second metallic layer in which transparent electrodes are positioned. When contact from an input mechanism, for example a pen-stylus, finger, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen is configured to sense contact from nearly any input mechanism. Although some embodiments of the e-paper tablet device are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that is configured to detect deflections when contact is made on the screen by an input mechanism. Accordingly, an inductive touchscreen is configured to sense contact from nearly any input mechanism. Although some embodiments of the e-paper tablet device are described herein with reference to a capacitive touchscreen, one skilled in the art would recognize that alternative touchscreen technology may be implemented, for example, an inductive touchscreen could also be implemented.

The cloud server 230 is configured to receive information from the e-paper tablet device 210 and/or communicate instructions to the e-paper tablet device 210. As illustrated in FIG. 2, the cloud server 230 may comprise a cloud data processor 250 and a data store 260. Data recorded and stored by the e-paper tablet device 210 may be communicated via the network 240 to the cloud server 230 for storage in the data store 260. For example, the data store 260 may store documents, images, or other types of content generated or recorded by a user through the e-paper tablet device 210. In some embodiments, the cloud data processor 250 monitors the activity and usage of the e-paper tablet device 210 and communicates processing instructions to the e-paper tablet device 210. For example, the cloud data processor 250 may regulate synchronization protocols for data stored in the data store 260 with the e-paper tablet device 210.

Interactions between the e-paper tablet device 210 and the cloud server 230 are typically performed via the network 240, which enables communication between the e-paper tablet device 210 and the cloud server 230. In one embodiment, the network 240 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 240 may also utilize dedicated, custom, or private communication links. The network 240 may comprise any combination of local area and/or wide area networks, using both wired and wireless communication systems.

Figure 3:
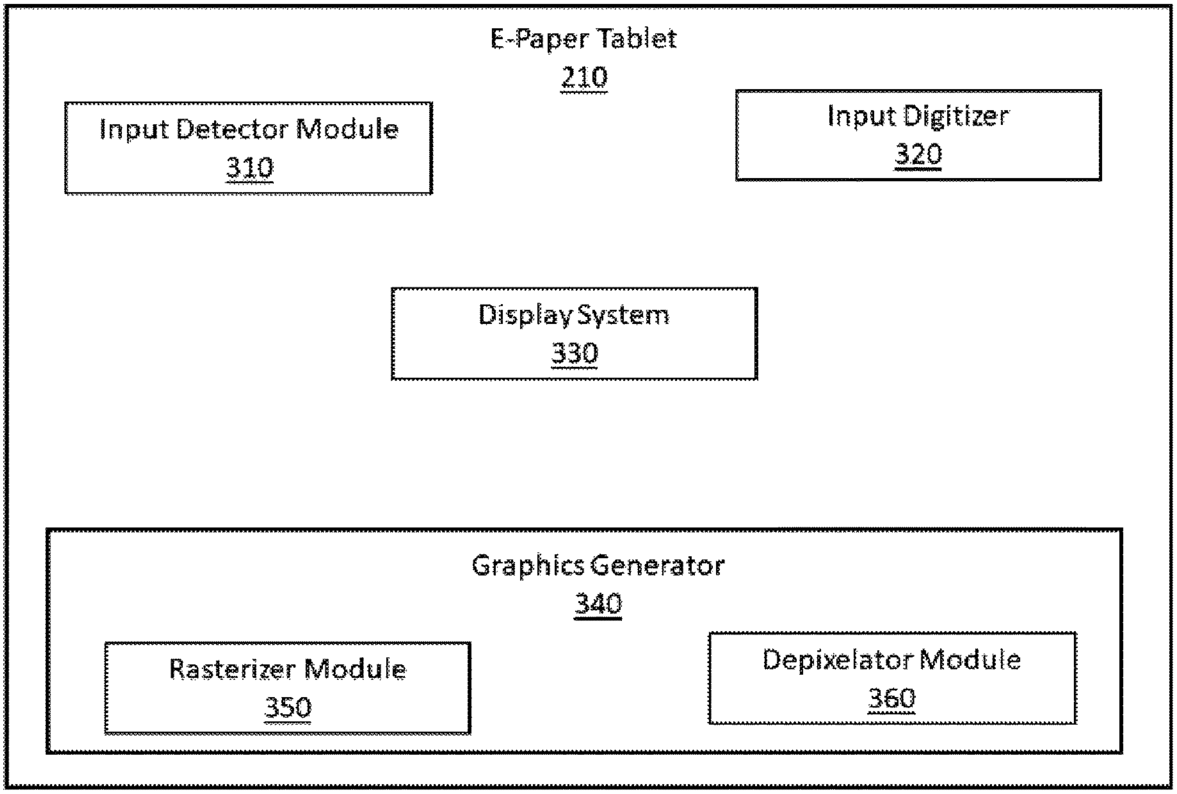
FIG. 3 is a block diagram of the system architecture of a e-paper tablet device, according to one example embodiment.

FIG. 3 is a block diagram of the system architecture of a e-paper tablet device, according to one example embodiment. In the embodiment illustrated in FIG. 3, the e-paper tablet device 210 comprises an input detector module 310, an input digitizer 320, a display system 330, and a graphics generator 340.

The input detector module 310 may be configured to recognize that a gesture has been or is being made on the screen of the e-paper tablet device 210. The input detector module 310 refers to electronics integrated into the screen of the e-paper tablet device 210 that are configured to interpret an encoded signal generated by contact between the input mechanism 220 and the screen into a recognizable gesture. To do so, the input detector module 310 may evaluate properties of the encoded signal to determine whether the signal represents a gesture made intentionally by a user or a gesture made unintentionally by a user.

The input digitizer 320 may be configured to convert the analog signal encoded by the contact between the input mechanism 220 and the screen into a digital set of instructions. The converted digital set of instructions may be processed by the e-paper tablet device 210 to generate or update a user interface displayed on the screen to reflect an intentional gesture.

The display system 330 may include the physical and firmware (or software) components to provide for display (e.g., render) on a screen a user interface. The user interface may correspond to any type of visual representation that may be presented to or viewed by a user of the e-paper tablet device 210.

Based on the digital signal generated by the input digitizer 320, the graphics generator 340 may be configured to generate or update graphics of a user interface to be displayed on the screen of the e-paper tablet device. The display system 330 may be configured to present those graphics of the user interface for display to a user using electronics integrated into the screen.

When an input mechanism 220 makes contact with a contact-sensitive screen of a e-paper tablet device 210, the input detector module 310 recognizes a gesture has been made through the screen. The gesture may be recognized as a part of an encoded signal generated by the compression of the coil in the input mechanism 220 and/or corresponding electronics of the screen of the display system 330. The encoded signal is transmitted to the input detector module 310, which evaluates properties of the encoded signal in view of at least one gesture rule to determine whether the gesture was made intentionally by a user. If the input detector module 310 determines that the gesture was made intentionally, the input detector module 310 communicates the encoded signal to the digitizer output. The encoded signal is an analog representation of the gesture received by a matrix of sensors embedded in the screen of the e-paper tablet 210.

In one example embodiment, the input digitizer 320 translates the physical points on the screen that the input mechanism 220 made contact with into a set of instructions for updating what is provided for display on the screen. For example, if the input detector module 310 detects an intentional gesture that swipes from a first page to a second page, the input digitizer 320 receives the analog signal generated by the input mechanism 220 as it performs the swiping gesture. The input digitizer 320 generates a digital signal for the swiping gesture that provides instructions for the display system 330 of the e-paper tablet device 210 to update the user interface of the screen to transition from, for example, a current (or first page) to a next (or second page, which may be before or after the first page).

In one example embodiment, the graphics generator 340 receives the digital instructional signal (e.g., swipe gesture indicating page transition (e.g., flipping or turning)) generated by the input digitizer 320. The graphics generator 340 generates graphics or an update to the previously displayed user interface graphics based on the received signal. The generated or updated graphics of the user interface are provided for display on the screen of the e-paper tablet device 210 by the display system 330, e.g., displaying a transition from a current page to a next page to a user. In the displayed embodiment of the FIG. 3, the graphics generator 340 comprises a rasterizer module 350 and a depixelator module 360. Input gestures drawn by a user on a contact-sensitive surface are received as vector graphics and are input to the rasterizer module 350. The rasterizer module 350 converts the input vector graphics to raster graphics, which can be displayed (or provided for display) on the contact-sensitive surface. The depixelator module 360 may apply image processing techniques to convert the displayed raster graphics back into vector graphics, for example to improve processing power of the e-paper tablet device 210 and to conserve memory of the e-paper tablet device 210. In at least one implementation, the depixelator module 360 may convert a displayed raster graphic back to a vector graphic when exporting content displayed on the screen into a different format or to a different system.

Further details about structures and functions of e-paper tablets and their graphical displays can be found in U.S. Pat. No. 11,158,097 to Martin Sandsmark and Gunnar Sletta entitled "Generating vector graphics by processing raster graphics" and in U.S. Pat. No. 10,824,274 to Sondre Hoff Dyvik, Martin Sandsmark, and Magnus Haug Wanberg, entitled "Interactive displays," both of which are incorporated by reference herein.

Figure 4:
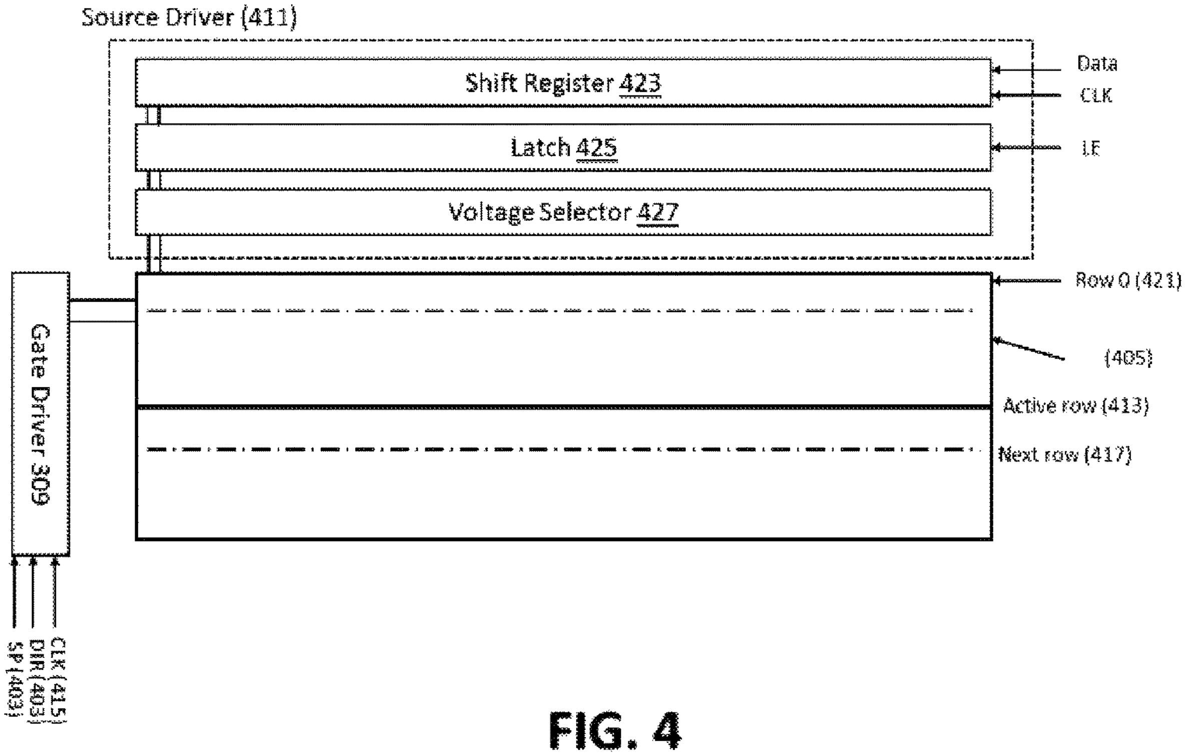
FIG. 4 illustrates hardware components of an example Electrophoretic Display (EPD) in accordance with a disclosed embodiment.

FIG. 4 illustrates hardware components of an example Electrophoretic Display (EPD) in accordance with a disclosed embodiment. The EPD may be part of the display system 330 of the e-paper tablet device 210, as shown in FIG. 3. The EPD includes a gate driver 309, a source driver 411, a shift register 423 with data and clock signal line, a latch 425, a voltage selector 427, and rows making up a display 405. The EPD industry borrowed certain components and concepts from the LCD industry; however, these two devices have some fundamental differences as well. Of particular relevance here is the persistence of pixels in EPD displays. Unlike LCD displays, EPD displays do not require the frequent refreshing required in an LCD display. In an EPD display, once a neutral voltage is set for a pixel, the pixel will not change, for example, and will persist for a long period of time, especially relative to an LCD display.

As mentioned, Electrophoretic displays (EPDs) 405 have utilized many aspects of LCD production infrastructure and driving mechanisms. The driving electronics typically consist of a gate driver (GD) 309 and a source driver (SD) 411. The display 405 has multiple rows of pixels. Pixel values within a row may be changed, e.g., logic high voltage may be a "black" pixel and a logic low voltage or "ground" may be a no colour pixel. The pixels in the EPD 405 function similarly to small capacitors that persist over long time intervals. An EPD pixel contains a large number of charged particles that are suspended in a liquid. If a charge is applied, the particles will move to a surface where they become visible. White and black particles have opposite charges such that a pixel's display may change from white to black by applying an opposite charge to the pixel. Thus, the waveforms applied to an EPD comprise long trains of voltages to change from black to white or vice versa. The EPD arts are also known to have the ability to apply variable voltage levels that mix the white and black particles to produce various shades of gray. Voltage levels in a pixel also may be tiered between to provide shades between no colour and black (e.g., levels of grey). Groups of pixels around each other may form a region that provides some visible characteristic to a user, e.g., an image on a screen, e.g., of the display system 330 of the e-paper tablet device 210.

To change pixel values in a region, a scan of a display 405 will conventionally start at a top row, e.g., row 0 421, and apply voltages to update pixels within a particular row where pixels need to be changed to correspond with the image that is displayed. In this example, a start pulse (GDSP) 103 can be used to reset the driver 411 to row 0 421. A row-by-row selection is made by driving the driver gate 309 to select a row, e.g., active row 413. All pixels in one row are addressed concurrently using data transferred to the display. Latch 425 receives from the shift register 423 the next set of voltages to be applied to a row of pixels. When the scan of the active row is completed and, if necessary, pixels changed or updated, a clock pulse (GDCLK) 415 is issued to the driver gate 309 to change to the next row 417 for a scan.

The source driver 411 is used to set the target voltage for each of the pixels/columns for the selected row. It consists of a shift register 423 for holding the voltage data, a latch circuit 425 for enabling pixel data transfer while the previous row is being exposed, and a voltage selector (multiplexer) 427 for converting the latched voltage selection into an actual voltage. For all rows to be updated all the voltage values have to be shifted into the register 423 and latched for the voltages to be available.

The reader can appreciate that the e-paper tablet device 210 described in FIG. 2 through FIG. 4 contains a reasonable amount of complexity. Embodiments of the display 330, for example, typically comprise a stack comprised of various components in the e-paper tablet device 210.

Figure 5:
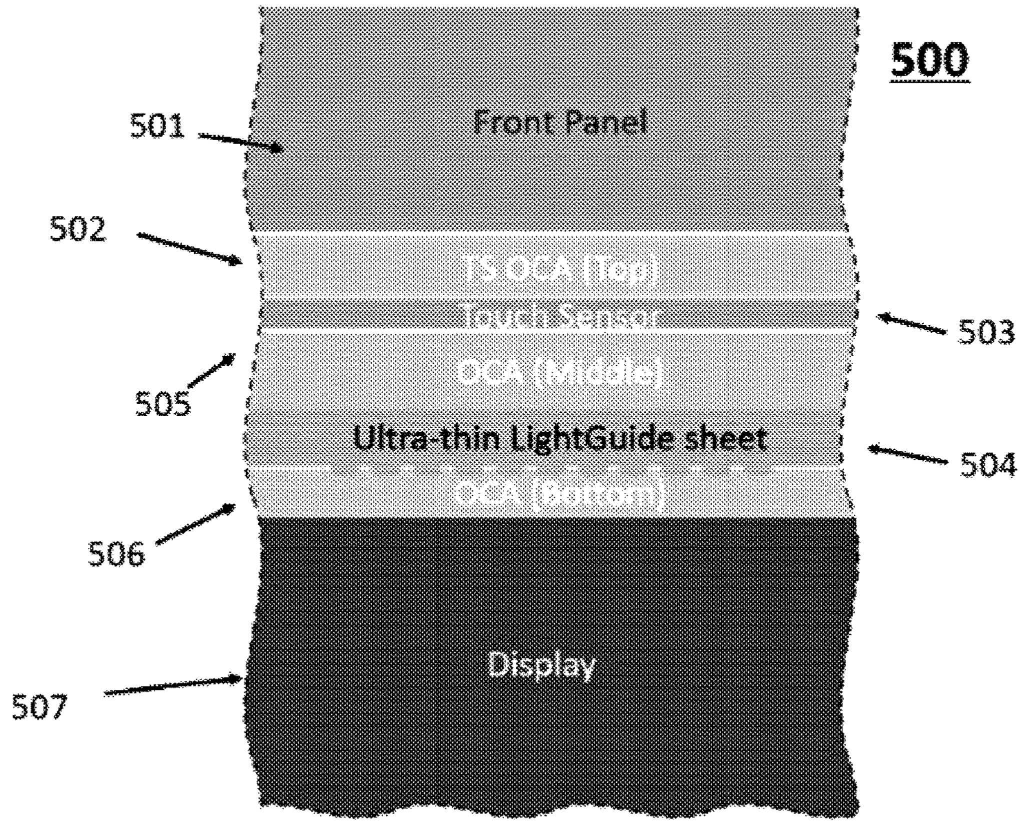
FIG. 5 illustrates a representative display stack 500 comprised of various display component layers.

FIG. 5 illustrates a representative display stack 500 comprised of various display component layers. From the bottom layer to a top layer, these layers comprise an EPD display 507, an optical clear adhesive layer 506, a lightguide sheet 504, an optical clear adhesive layer 505, a touch sensor 503, an optical clear adhesive layer 502, and a front panel 501. The EPD display 507 may comprise components similar to the display 405 described in FIG. 4. If writing technology is present (not shown in FIG. 5, but if present, then it is likely below the EPD display 507), the writing technology may comprise similar elements to the graphics generator 340 disclosed in FIG. 3. The optical clear adhesive layers 506, 504, 502 are employed to attach components from other portions in the stack 500 together but to do so in a manner that does not alter or impede the light transiting through the stack 500 to the user. The touch sensor 503 operates as a portion of the touchscreen that has been described above, particularly in conjunction with FIG. 2. The stack 500 is conventionally capped by a front panel 501 that the user may touch during device operation. The front panel 501 is conventionally comprised of glass but could be comprised of other materials. For example, U.S. patent application Ser. No. 18/114,896, filed on 27 Feb. 2023 and U.S. Provisional Application No. 63/314,500, filed on 28 Feb. 2022, both entitled "Cover Lens for Consumer Electronics Device," and both incorporated by reference, describe one such front panel suitable for implementation in the stack 500.

The lightguide sheet 504 is described in FIG. 5 as an ultra-thin lightguide sheet. As discussed above, consumer demands have compelled display stacks like the display stack 500 to become increasingly thinner so that the overall device (e.g., the e-paper tablet device 210) can itself become thinner and so that the parallax effect due to the separation between the EPD and the writing surface can be reduced.

As discussed in the background section, a conventional solution for providing a lightguide in a display stack on a passive display device comprises coupling a light source (e.g., LEDs) directly to the lightguide in the display stack. However, as display stacks have been forced to become thinner, the difference in height between the light sources and lightguides has grown significantly. As a consequence, a substantial amount of light provided by the light source in such thin devices fails to enter the lightguide, thus impairing the overall functionality of the frontlight.

Example of an Ultra-Thin Frontlight

Figure 1:
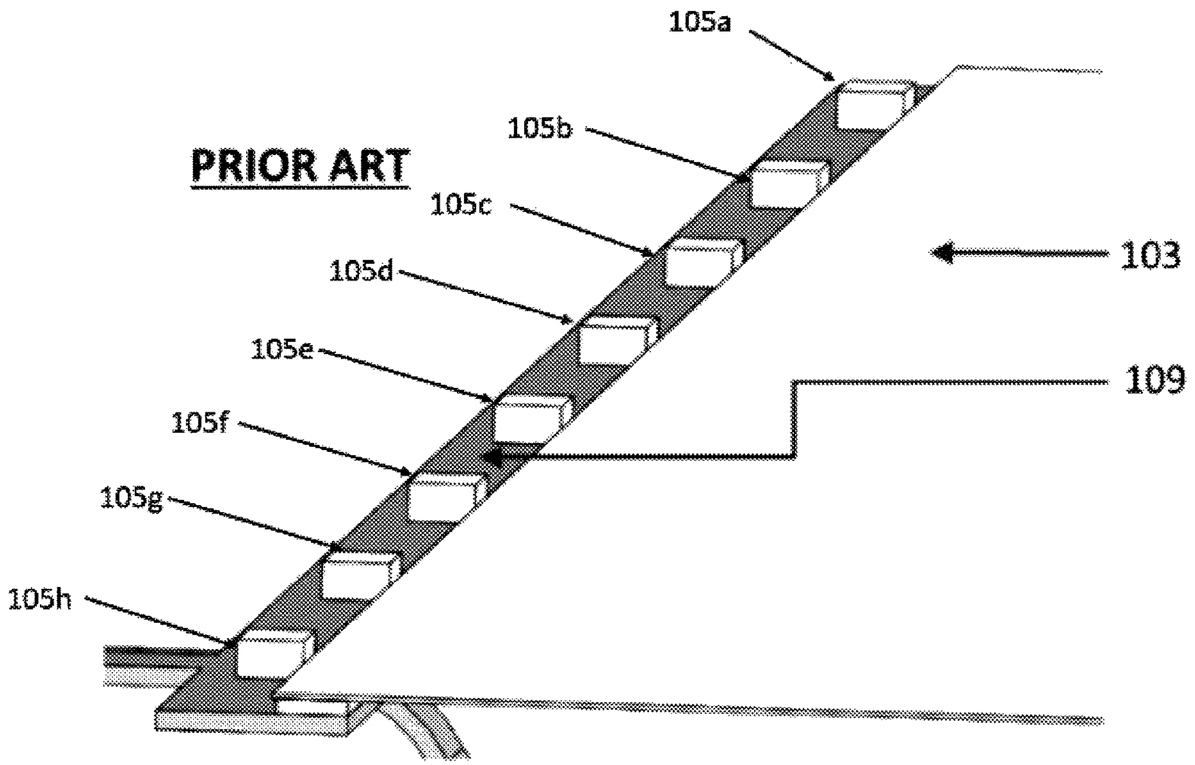
FIG. 1 illustrates a prior art frontlight having a lightguide 103 that is directly coupled to an array of light sources (e.g., LEDs 105*a*-105*h*).

FIGS. 6-11 describe embodiments of an ultra-thin frontlight having an optical coupling element that aids in efficiently transitioning light from a light source to a lightguide. The inventors have offered a solution to the problem of coupling efficiency in thin frontlights (e.g., as described in FIG. 1) by introducing an additional optical coupling element that increases coupling efficiency. The resulting ultra-thin frontlight is suitable for implementation in a display stack, such as the display stack 500 shown in FIG. 5 and ultimately suitable for integration into devices, such as the e-paper tablet device 210. Embodiments of the ultra-thin frontlight may comprise lightguides at least as thin as 50 um for incorporation into the e-paper table 210 shown in FIG. 2.

As mentioned, embodiments of the ultra-thin frontlight include an optical coupling element, an additional optical element, intended to improve coupling from the light source (e.g., LEDs) to the lightguide. The disclosed configuration differs from the conventional approach shown in FIG. 1 in which the light source is "directly coupled" to the lightguide due to the intervening presence of the optical coupling element. An ordinary artisan will note that ultra-thin lightguides (e.g., 50 um or thinner) are not necessarily conventional "off the shelf" components but are nevertheless components well within conventional scientific and engineering understanding.

Embodiments of the invention attempt to solve to the problem of coupling efficiency in thin frontlights (e.g., as described in FIG. 1) by introducing an additional optical coupling element that increases coupling efficiency. This optical coupling element acts to contain the light spreading out from the LED and helps to couple more of the light from a thicker/taller light source into a slender/thinner light guide. Thus, the inventors have offered a solution to the problem of coupling efficiency in thin frontlights through this optical coupling element described herein.

In the absence of an additional optical coupling element, light from the source is only coupled into the lightguide if it is both within the area of the source that is adjacent to the lightguide, and within the range of acceptance angles for the lightguide. (Light at higher angles may initially enter the lightguide but will exit it within a short distance.) A large proportion of the light emitted by the source is outside the acceptance angle and/or area of the lightguide and is therefore wasted. The intent of the additional optical coupling element is to cause this unused light to undergo multiple reflections which ultimately lead to it entering the lightguide rather than being lost. The reflecting surfaces of the optical coupling element act to confine the light until it is incident on the lightguide.

Figure 6:
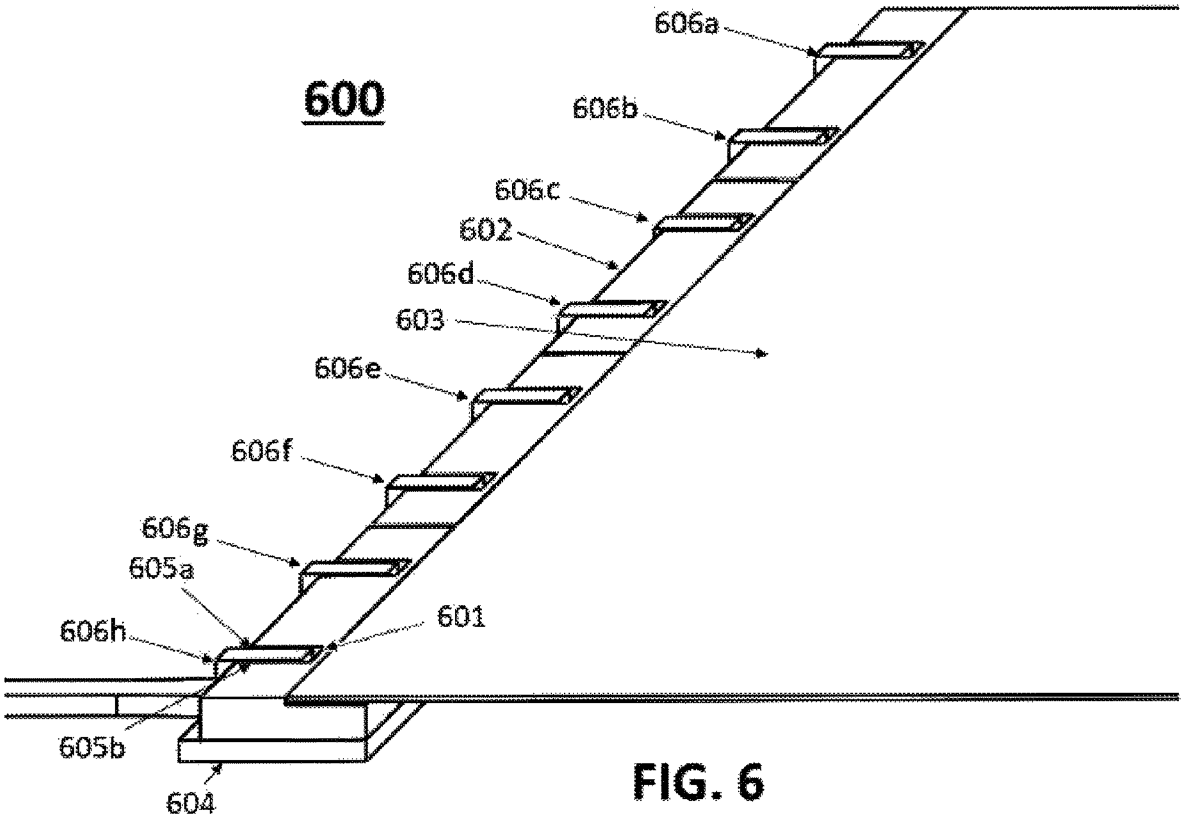
FIG. 6 illustrates a frontlight 600 having a lightguide 603 positioned at the top of a structure into which the light source (e.g., LEDs 606*a*-606*h*) provides light.

FIG. 6 illustrates a frontlight 600 having a lightguide 603 positioned at the top of a structure into which the light source (e.g., LEDs 606*a*-606*h*) provides light. This structure, optical coupling element 602, is placed adjacent to the lightguide 603. The light sources may be placed adjacent to the optical coupling element 602, or in a recess 601 in the optical coupling element as shown on FIG. 6. Thus, the optical coupling element 602 resides between the lightguide 603 and the light source (e.g., LEDs 606*a*-606*h*).

If present, the recess 601 may include small gaps 605*a*, 605*b* shown at either side of the LED 606*h*. The gaps 605*a*, 605*b* are not necessary for the optical functioning of the frontlight 600 but may be included to allow for manufacturing tolerances. The optical coupling element 602 has a height that is greater than or equal to the height of the light source (e.g., LEDs 606*a*-606*h*). The optical coupling element 602 is typically comprised of the same material (e.g., a polycarbonate) as the lightguide 603. The optical coupling element 602 has the same refractive index as the lightguide 603. The optical coupling element 602 does not have to be perfectly index matched to the lightguide 603; preferably, the optical coupling element 602 is index matched to the lightguide 603, otherwise the efficiency is likely reduced. In the frontlight 600, the light source (e.g., LEDs 606*a*-606*h*) rests on a circuit board 604 (e.g., a flex PCB) which also supports the optical coupling element 602. The lightguide 603 is supported by other layers of the display stack above or below it which are not shown in FIG. 6.

The optical coupling element 602 comprises a solid transparent element with some reflective faces, which improves the efficiency of coupling light into the light guide (e.g., the lightguide 603 shown in FIG. 6). The reflective surfaces may be achieved either through total internal reflection due to the refractive index difference between the coupling element and the material surrounding it, or by using a mirror coating, which may be either a metal mirror or a dielectric mirror. Rays from the LEDs 606*a*-606*h* that initially miss the lightguide (e.g., the lightguide 603 shown in FIG. 6) are reflected at surfaces on the optical coupling element 602 and enter the lightguide 603 after undergoing these additional reflections. In manufacturing, any surface where total internal reflection is desired should preferably be polished, and it is likely to be advantageous to also polish surfaces where a mirror coating is deposited. If a mirror coating is used it should be as uniformly deposited as possible and complete across the relevant surfaces for the optical coupling element 602 to perform as intended. It is not necessary for the reflecting surfaces to be 100% reflective but performance is improved for higher reflectivity. See, FIGS. 11A-11D for a further discussion regarding the polishing and mirror coating of various surfaces on an embodiment of the optical coupling element 602.

In a representative embodiment of the invention, rather than light transiting from a roughly 300 micron LED emitting face and into a narrow face (e.g., 50 microns) of the lightguide 603, because of the intervening optical coupling element 602, much of the light now enters on a lower portion of the lightguide 603. This connection may be particularly advantageous because the surface quality of the top and bottom portions of a lightguide 603 are typically superior to the edge portions of the lightguide 603 which would be the portions receiving light in a direct connection (see, e.g., FIG. 1). It has been observed that the edge portions of lightguides tend to have more defects than the top and bottom portions.

The performance of the frontlight 600 depends to a large degree on the specific materials selected for the lightguide 603 and the optical coupling element 602. For the lightguide, materials having a higher refractive index have a larger acceptance angle and so will be able to couple more light through the structure of the frontlight 600. So, for example, polycarbonate lightguides have a larger acceptance angle than those made of Polymethyl methacrylate (PMMA). The optical absorption properties are also important—for example, Polyethylene terephthalate (PET) may be employed but is more highly absorbing of blue light and can cause a yellowing colour shift which may be undesirable for some applications, such as when a "cooler" colour tone is desired. The materials employed for the optical coupling element 602 are essentially materials conventionally employed in lightguides, and a unique material does not appear to be necessary for the optical coupling element 602.

The optical coupling element 602 performs its intended function more effectively the closer its refractive index is matched to that of the lightguide 603. Optically an ideal situation is for the optical coupling element 602 and the lightguide 603 to appear (and function) as essentially a single contiguous piece having a uniform refractive index. The optical coupling element 602 and the lightguide 603 can likely not be fabricated as a single piece because different processes are typically employed to manufacture each component. However, if these components could be manufactured as one integral piece, such a combined piece would also be suitable.

The optical coupling element 602 may have a number of overall shapes. FIG. 6 illustrates an essentially rectangular optical coupling element 602, but the shape of the optical coupling element 602 could take other forms. For example, the walls of the optical coupling element 602 could be sloped or slanted in various directions without performance degradation. The rectangular shape shown in FIG. 6 is possibly easier to manufacture by some processes (e.g., molding) than if the optical coupling element 602 had another shape. Thus, if a different manufacturing process was more optimal for some particular material, then it may be possible to adjust the shape of the optical coupling element 602 without a significant degradation of performance.

The height of the optical coupling element 602 should approximately match or exceed the height of the light source (e.g., the LEDs 606*a*-606*h*). Thus, the minimum size of the optical coupling element 602 is essentially constrained (or governed) by the height of the LED emitting surface. If the LED employed were to be smaller than the approximately 300 micron LED emitter height contemplated for insertion into the recess 601 in the embodiment of the invention shown in FIG. 6, then the optical coupling element 602 could likewise diminish. (The recess 601 could alternatively be termed a "slot" or a "hole.")

The benefit of the optical coupling element 602 depends on the disparity between the height of the lightguide 603 and the height of the light source (the LEDs 606*a*-606*h*). As the disparity increases (i.e., the light source becomes taller compared to the thickness of the lightguide), the benefit of the optical coupling element 602 increases. As the disparity decreases, and the light source becomes comparable in height to the thickness of the lightguide, the benefit of the optical coupling element 602 becomes negligible, and the coupling efficiency is similar to that which can be achieved in the direct coupling case. In such embodiments where the height of the source is the same as the thickness of the lightguide, the optical coupling element 602 would likely not be needed, unless other manufacturing or assembly considerations made this configuration more advantageous. The mathematical form of the dependence of efficiency improvement on height ratio is not defined exactly and may depend on the coupling element geometry, but for some embodiments this is seen to be a straight-line relationship followed by an asymptotic decline as the height ratio approaches 1:1.

Table 1 illustrates the performance of one embodiment of the optical coupling element 602 based on simulation data. Table 1 shows the optical coupling efficiency simulated for optical coupling element designs for 50 um and 150 um light guides and an approximately 300 um LED, neglecting the effects of adhesives. The optical coupling element efficiency figures in Table 1 assume that the front face of the LED acts as a Lambertian reflector for any rays which are reflected back onto it. Any absorption by the LED face will reduce the coupling efficiency with the optical coupling element from the values shown.

TABLE 1

| | Direct coupled | Optical coupling element | Direct coupled | Optical coupling element |
|---|---|---|---|---|
| Guide thickness | 50 um | | 150 um | |
| Single LED power at 100 mm into guide | 1.6 lm | 4.5 lm | 4.9 lm | 7.6 lm |
| Max. efficiency | 10% | 27% | 30% | 46% |

Table 2 illustrates the alignment sensitivity of the optical coupling element 602 for one embodiment of the invention. The sensitivity of the coupling efficiency to different spatial misalignments between the LED and the optical coupling element 602 has been assessed in simulation. It is assumed the LED emits light at the boundary of the package, and there in a nominal 5 um air gap between the LED emissive surface and the optical coupling element 602 when the two components are aligned.

TABLE 2

| Quantity | 50 um Efficiency reduction × 0.8 |
|---|---|
| Displacement from emitting face (Longitudinal) | 55 um |
| Vertical displacement | −50 um/+75 um |
| Yaw | +/−¯2 deg (yaw leads to longitudinal displacement which has greater effect) |
| Pitch | +/−2.5 deg |
| Roll | +/−4 deg |

The coupling efficiency does not appear to be very sensitive to tilts but is strongly affected by displacements in the vertical and longitudinal directions. The displacements corresponding to a reduction in efficiency by a factor of 0.8 are smaller than in the direct coupled case, in at least one embodiment of the invention. However, the optical coupling element and LED hole 601 can act as a datum feature, and the alignment tolerance is likely to be easier to achieve (this assumes the PCB 604 has some flexibility to slight changes in LED position). To maintain efficiency within 80% of the maximum value the displacements should likely be kept within the limits shown in Table 2, at least for one embodiment of the invention.

Figure 7:
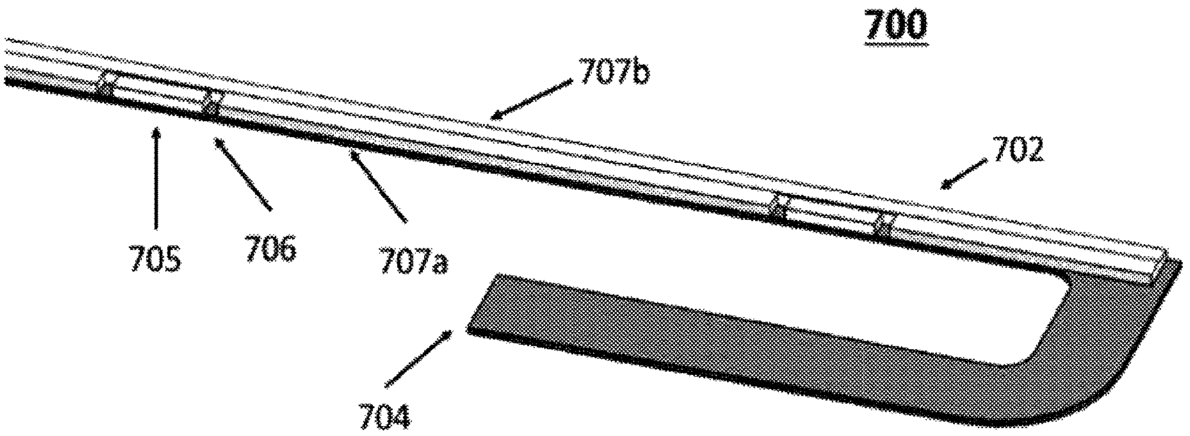
FIG. 7 illustrates an assembly 700 that includes a light source (LED 705), an optical coupling element 702, and a circuit board 704 in an embodiment of the invention.

FIG. 7 illustrates an assembly 700 that includes a light source (LED 705), an optical coupling element 702, and a circuit board 704 in an embodiment of the invention. The components shown in FIG. 7 are similar to the components shown in FIG. 6. A recess 706 resides between the LED 705 and the optical coupling element 702 which facilitates improved manufacturing tolerances for the assembly 700. The circuit board, LEDs and coupling element should preferably be lined up with each other. The width of the recess may allow some wiggle room in the positioning of the LEDs relative to the recesses. Tolerances for the lightguide are typically unaffected. The size of the recess 706 depicted in FIG. 7 has been somewhat exaggerated for purposes of illustration. The size of the recess 706, and the recess 601 shown in FIG. 6, could be reduced with improvements in manufacturing processes, and the recess 706 in a production model would not be so large as to impair the performance of the frontlight 700.

In operation, light exits the LED 705 and enters a face on the optical coupling element 702. Once the light has entered the optical coupling element 702, from an optical perspective, the connection between the optical coupling element 702 and the light guide (e.g., the lightguide 603 shown in FIG. 6) is approximately optically contiguous (little or no change in refractive index). Thus, some of the light travels diagonally straight up through the optical coupling element 702 and into the light guide (e.g., the lightguide 603 shown in FIG. 6).

Light which does not reach the lightguide directly in this way instead hits one of the reflecting surfaces of the optical coupling element 702 (see, the discussion of reflecting surfaces shown in FIGS. 11*a*-11*d*) and is reflected back into the optical coupling element. This light may then undergo multiple reflections within the optical coupling element before attaining a trajectory which reaches the lightguide. The coupling of this extra light into the lightguide increases the overall coupling efficiency. Note that not all of the light reaches the guide—some may either escape from the optical coupling element or be absorbed.

Figure 8:
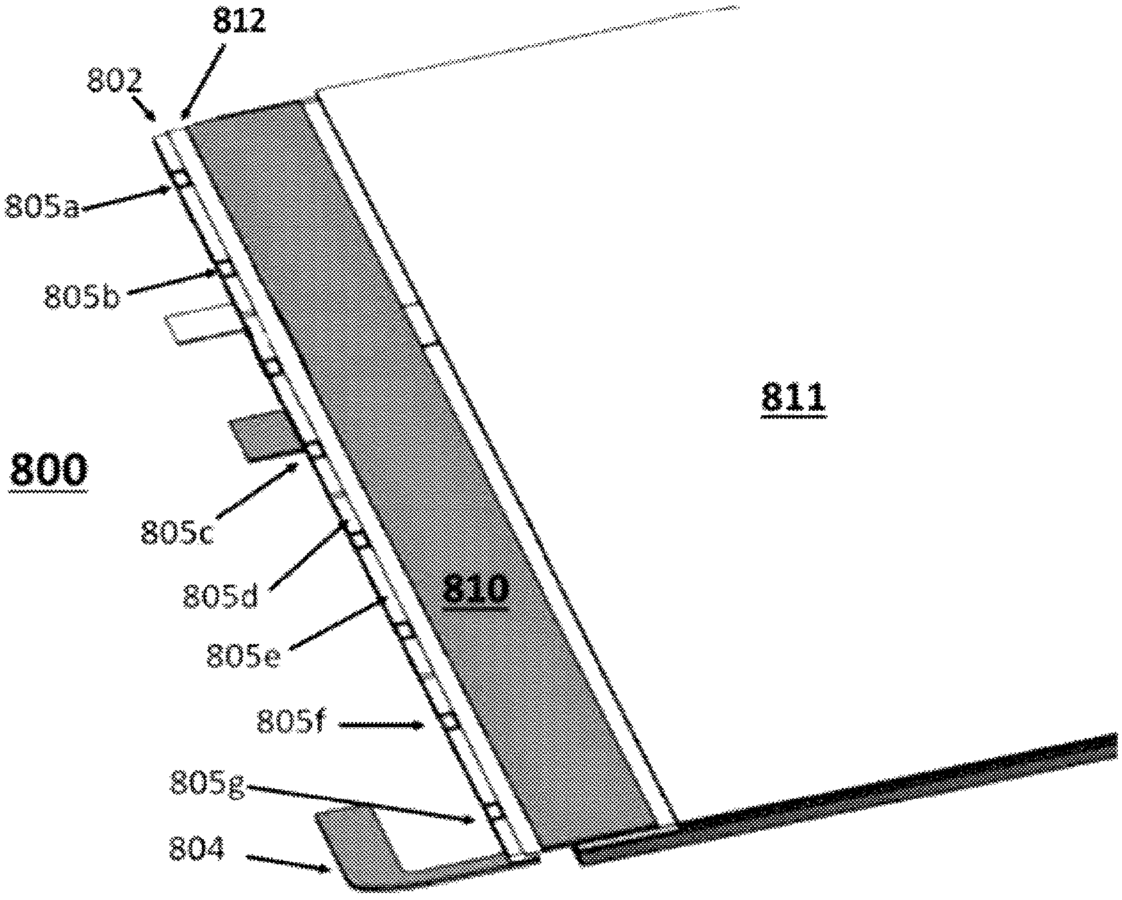
FIG. 8 illustrates a frontlight 800 along with other components in a display stack, such as the display stack 500 shown in FIG. 5.

FIG. 8 illustrates a frontlight 800 along with other components in a display stack, such as the display stack 500 shown in FIG. 5. The frontlight 800 comprises a light guide 812, an optical coupling element 802 and a plurality of light sources (LEDs 805*a*-805*g*) disposed on a circuit board 804. FIG. 8 also illustrates other components in a display stack, such as a front panel 811 and a light blocking film 810 which is attached to a portion of the lightguide 812. FIG. 8 otherwise resembles the embodiment of the invention shown in FIG. 6.

Figure 9A:
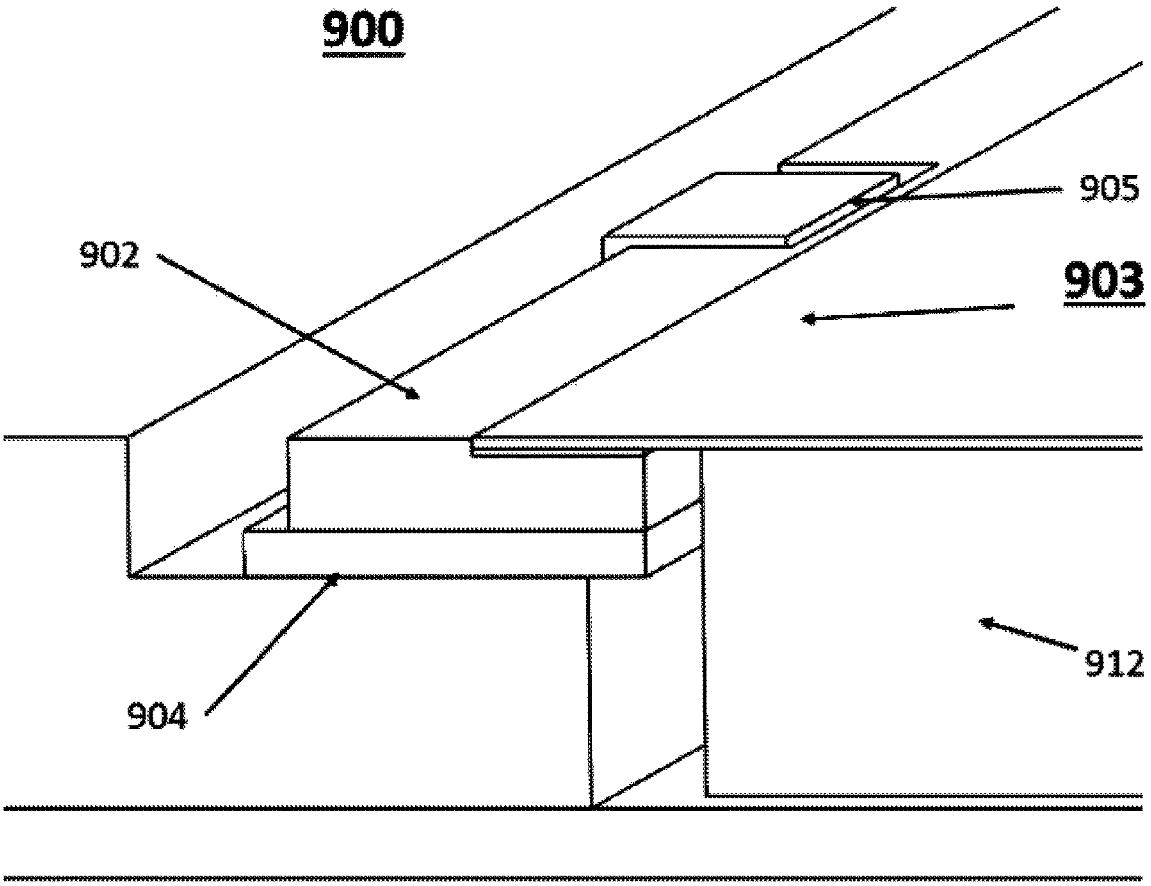
FIG. 9A illustrates a frontlight 900 among other components in a display stack, such as the display stack 500 shown in FIG. 5.

FIG. 9A illustrates a frontlight 900 among other components in a display stack, such as the display stack 500 shown in FIG. 5. The frontlight 900 comprises an optical coupling element 902, an LED 905, and lightguide 903. The optical coupling element 902 and the LED are disposed on a circuit board 904. The lightguide 903 sits on top of lower layers of the display stack 912 such as the lower layers shown in FIG. 4.

The optical coupling element 902 is typically adhered to the lightguide 903 using an index matching optical adhesive or with a solvent that creates a bond between these components. The optical adhesive may be easy to employ in manufacturing. Similarly, there is likely to be adhesive between the LED 905 and the optical coupling element 902. The adhesive will likely be pressed in place and then cured. Alternatively, there may be a small air gap between the light source and the optical coupling element 902.

Figure 9B:
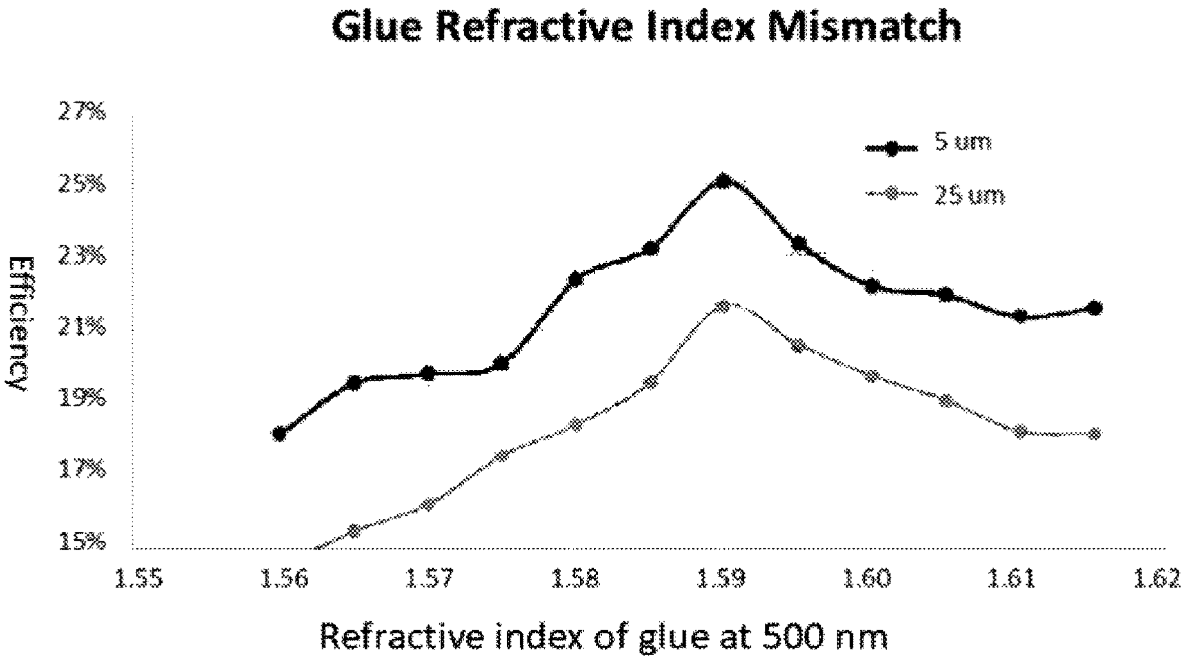
FIG. 9B provides a graph illustrating how the coupling efficiency degrades with refractive index mismatch for an embodiment of the invention having adhesive thicknesses of 5 um and 25 um.

FIG. 9B provides a graph illustrating how the coupling efficiency degrades with refractive index mismatch for an embodiment of the invention having adhesive thicknesses of 5 um and 25 um.

Thus, the adhesive employed should have the same (or at least a similar) refractive index as the material (e.g., polycarbonate) employed in the lightguide 903 and the optical coupling element 902. The inventors have observed that conventional adhesives and manufacturing processes appear to be somewhat tunable to a given material. In any event overall performance of the frontlight 900 will be improved the closer the refractive indices of the adhesives employed match the materials of the lightguide 902 and the optical coupling element 902.

Figure 10:
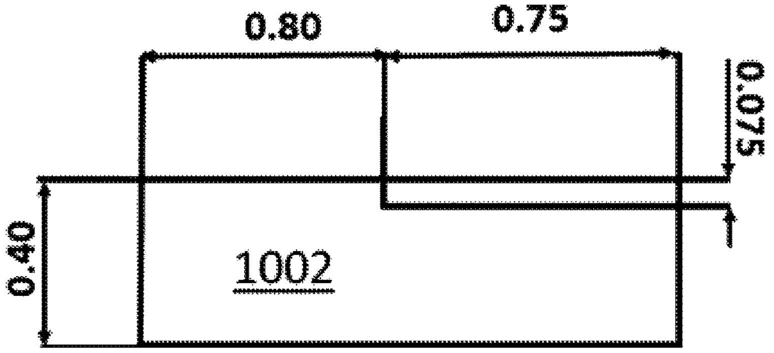
FIG. 10 illustrates an embodiment of an optical coupling element 1002 in cross section.
Figure 11A:
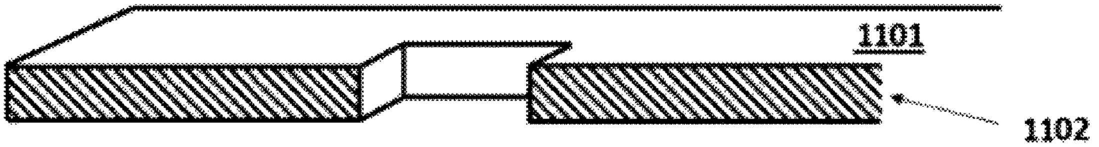
FIGS. 11A-11D illustrate an embodiment of the invention that shows an optical coupling element 1101.
Figure 11B:
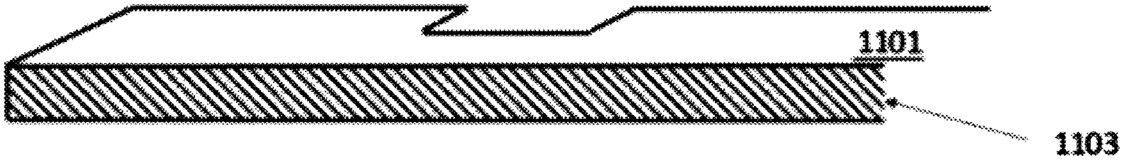
Figure 11C:
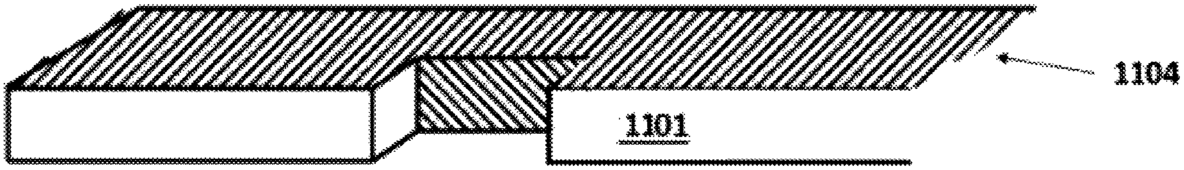
Figure 11D:
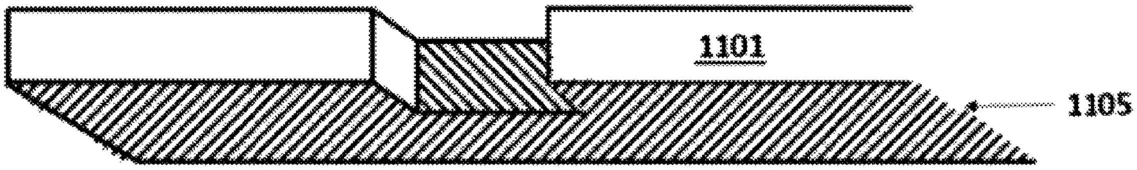

FIG. 10 illustrates an embodiment of an optical coupling element 1002 in cross section. The optical coupling element 1002 includes a roughly 750 micron area into which a lightguide (such as the lightguide 903 shown in FIG. 9A) may be inserted. As mentioned, some embodiments of the ultra-thin frontlight are intended to operate with lightguides which have thicknesses of approximately 50 microns. Nevertheless, FIG. 10 illustrates a region of roughly 75 microns in height for the insertion of a lightguide. The additional 25 microns are intended to compensate for the minimal thickness of adhesives and for machining tolerances.

FIGS. 11A-11D illustrate an embodiment of the invention that shows an optical coupling element 1101. In this embodiment rear surface 1102 and front surface 1103 are mirror coated, and top surface 1104 and bottom surface 1105 are optically polished. Light incident on surfaces 1102 and 1103 from within the body of the optical coupling element is reflected back into the body of the optical coupling element. Light incident on surfaces 1104 and 1105 from within the optical element is reflected back into the body of the optical coupling element if the incident angle is below the critical angle for total internal reflection. Using total internal reflection reflects a smaller range of angles but may be preferable to a mirror coating due to lower loss.

Example Computing Machine Architecture

Figure 12:
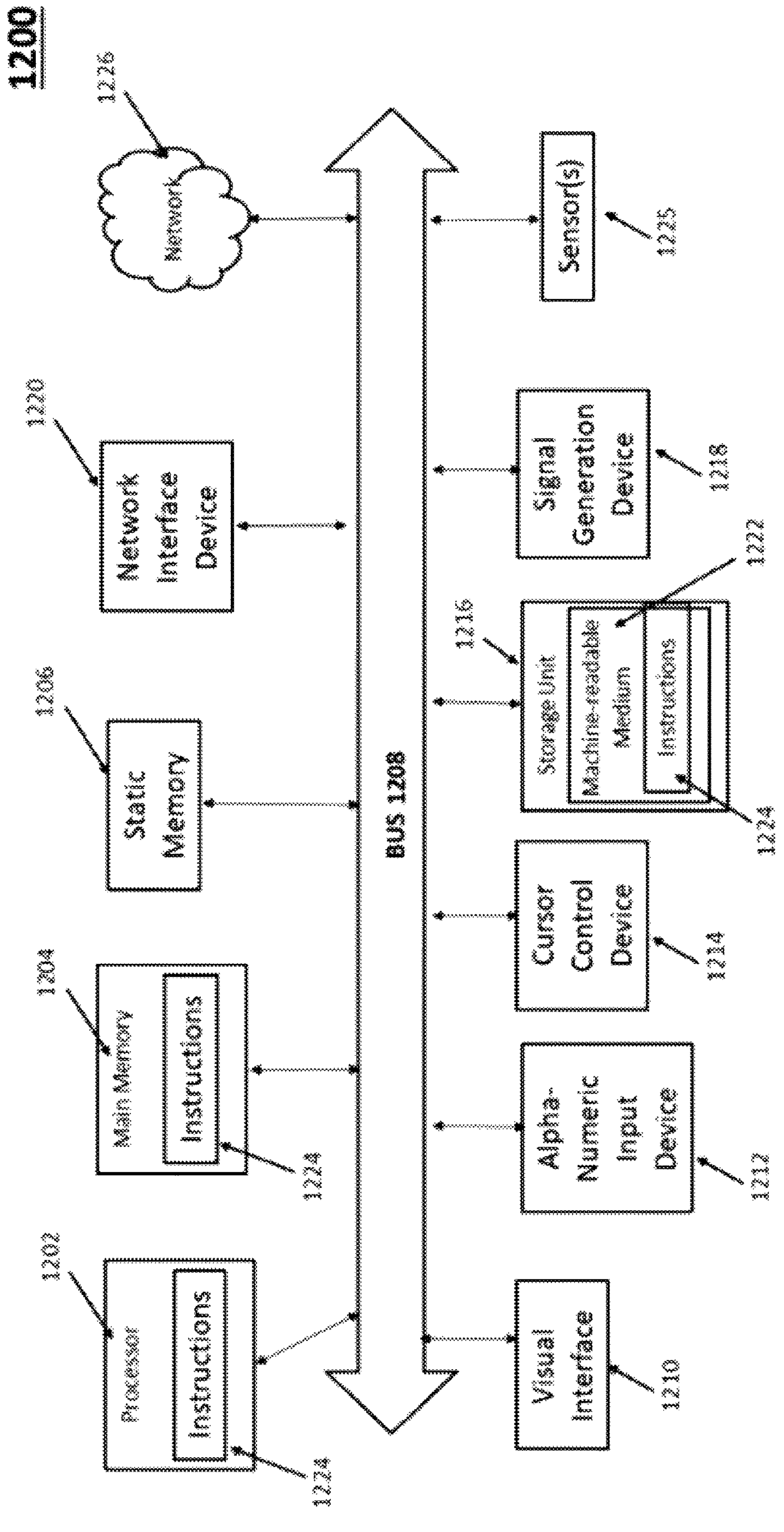
FIG. 12 is a block diagram illustrating components of an example machine able to read instructions from a machine-readable medium and execute them in a processor (or controller), according to one embodiment.

FIG. 12 is a block diagram illustrating components of an example machine able to read instructions from a machine-readable medium and execute them in a processor (or controller), according to one embodiment. FIG. 12 is an example of a processing system, of which a some of the described components or all of the described components may be leveraged by the modules described herein for execution.

In this example, FIG. 12 shows a diagrammatic representation of a machine in the example form of a computer system 1200 (e.g., the computing portions of the e-paper tablet 210 shown in FIG. 3) within which program code (e.g., software) for causing the machine to perform any one or more of the methodologies discussed herein may be executed. The e-paper tablet device 210 may include some or all of the components of the computer system 1200. The program code may be comprised of instructions 1224 executable by one or more processors 1202. In the e-paper tablet system 210, the instructions may correspond to the functional components described in FIGS. 2-4.

While the embodiments described herein are in the context of the e-paper tablet system 210, it is noted that the principles may apply to other touch sensitive devices. In those contexts, the machine of FIG. 12 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes one or more processors 1202 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include visual display interface 1210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1210 may include or may interface with a touch enabled screen, e.g., of the e-paper tablet system 210 and may be associated with the display system 330. The computer system 1200 may also include an input device 1212 (e.g., a pen-stylus, a keyboard or touch screen keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored (or encoded) instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

The computer system 1200 also may include the one or more sensors 1225. Also note that a computing device may include only a subset of the components illustrated and described with FIG. 12. For example, an IoT device may only include a processor 1202, a small storage unit 1216, a main memory 1204, a visual interface 1210, a network interface device 1220, and a sensor 1225.

ADDITIONAL CONSIDERATIONS

This disclosed configuration provides additional precision and options for users as they go about erasing portions of drawings on an e-paper tablet. This should improve the efficiency of users interacting with e-paper tablets while also enabling them with more precise functional capabilities.

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The invention claimed is:

1. A frontlight in a tablet computing device, comprising:
a light source;
an optical coupling element that receives light from the light source wherein the optical coupling element comprises at least two mirror coated surfaces and at least two uncoated optically polished surfaces; and
a lightguide that receives light from the light source through the optical coupling element,
wherein the light source has an emitter height greater than a thickness of the lightguide.

2. The frontlight of claim 1 wherein the optical coupling element has a height equal to or greater than the height of the light source.

3. The frontlight of claim 2 wherein the optical coupling element has a front surface adjacent to the lightguide that has been mirror coated, wherein light incident on the front surface from within the optical coupling element is reflected back into the optical coupling element, and a rear surface adjoining the light source that has been mirror coated, wherein light incident on the rear surface from within the optical coupling element is reflected back into the optical coupling element.

4. The frontlight of claim 1 wherein the light source comprises a plurality of LEDs, wherein each LED of the plurality of LEDs is adjacent to the optical coupling element.

5. The frontlight of claim 4 wherein each LED of at least a portion of the LEDs of the plurality of LEDs resides in a recess adjacent to the optical coupling element.

6. The frontlight of claim 1 wherein the lightguide and the optical coupling element are composed of a same material.

7. The frontlight of claim 6 wherein the material is a polycarbonate.

8. The frontlight of claim 1 wherein the optical coupling element has a refractive index that matches the lightguide.

9. The frontlight of claim 1 wherein the optical coupling element is refractively index matched to the lightguide.

10. The frontlight of claim 1 wherein the lightguide comprises a first material having a high refractive index and a large acceptance angle that couples more light through the frontlight and into a display stack than a second material having a lower refractive index and a lower acceptance angle.

11. The frontlight of claim 1 wherein the light source and the optical coupling element rest on a circuit board and wherein the lightguide is supported by a plurality of layers in a display stack.

12. The frontlight of claim 11 wherein two layers of the plurality of layers in the display stack comprise a front panel and a light blocking film that is attached to a portion of the lightguide.

13. The frontlight of claim 1 wherein the at least two mirror coated surfaces are one of metal mirror or dielectric mirror.

14. The frontlight of claim 1 wherein the optical coupling element comprises a solid transparent body and wherein the at least two mirror coated surfaces and the at least two uncoated optically polished surfaces provide reflective faces on the optical coupling element, providing total internal reflection by at least one of a refractive index difference between the optical coupling element and material surrounding it in the tablet computing device and by the at least two mirror coated surfaces.

15. The lightguide of claim 14 wherein light originating from the light source that initially misses the lightguide while traversing the optical coupling element are reflected at surfaces on the optical coupling element and enter the lightguide after undergoing additional reflections within the optical coupling element.

16. The lightguide of claim 1 wherein the optical coupling element comprises a rectangular shape.

17. The frontlight of claim 1 wherein the light source comprises a plurality of LEDs, each LED having an emitter height of 300 microns and wherein the lightguide has a height of 50 microns.

18. The frontlight of claim 1 wherein the optical coupling element includes a roughly 750 micron wide receiving area configured to receive the lightguide, wherein the lightguide has a thicknesses of approximately 50 microns, and wherein the receiving area has a depth of approximately 75 microns for insertion of the lightguide.

19. A frontlight in a tablet computing device, comprising;
a light source;
an optical coupling element that receives light from the light source, wherein the optical coupling element has a height equal to or greater than the height of the light source and wherein the optical coupling element has a top surface and a bottom surface, wherein both the top surface and the bottom surface are optically polished, wherein light having an incident angle below a critical angle for total internal reflection that is incident on at least one of the top surface and the bottom surface is reflected into the body of the optical coupling element; and
a lightguide that receives light from the light source through the optical coupling element, wherein the light source has an emitter height greater than a thickness of the lightguide,
wherein the optical coupling element has a front surface adjacent to the lightguide that has been mirror coated, wherein light incident on the front surface from within the optical coupling element is reflected back into the optical coupling element, and a rear surface adjoining the light source that has been mirror coated, wherein light incident on the rear surface from within the optical coupling element is reflected back into the optical coupling element.

20. The frontlight of claim 19 wherein the light source comprises a plurality of LEDs, wherein each LED of the plurality of LEDs is adjacent to the optical coupling element.

* * * * *